F. KNEIFEL & T. H. WATT.
COOKING UTENSIL.
APPLICATION FILED SEPT. 12, 1911.
1,022,245.
Patented Apr. 2, 1912.
2 SHEETS—SHEET 1.
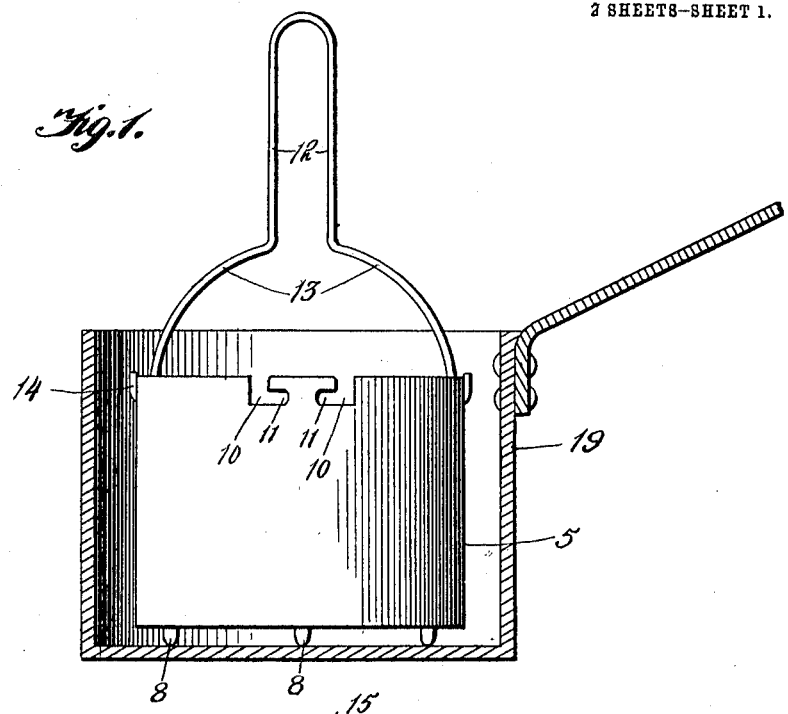
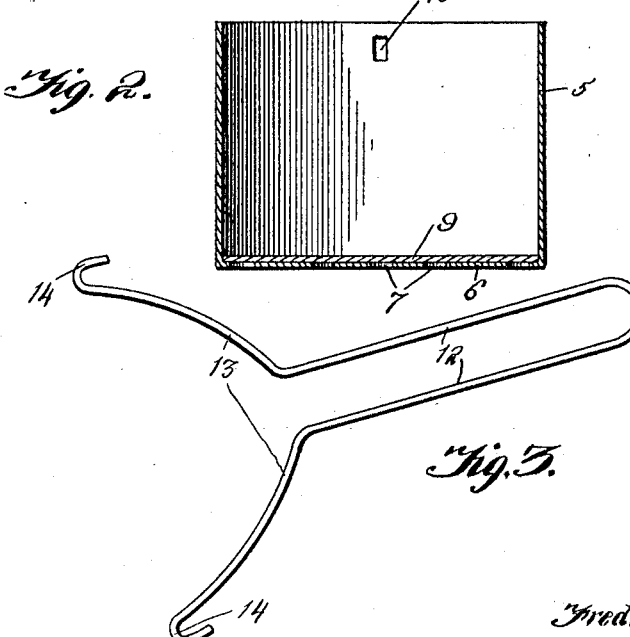
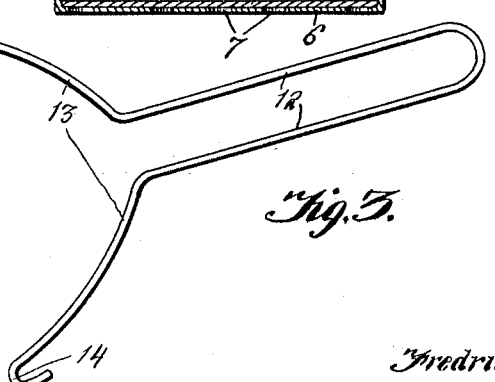
Witnesses
Alan F. Garner
H. O. Parker
Inventors
Fredrick Kneifel
Thomas H. Watt
By Victor J. Evans
Attorney
COLUMBIA PLANOGRAPH CO., WASHINGTON, D. C.

F. KNEIFEL & T. H. WATT.
COOKING UTENSIL.
APPLICATION FILED SEPT. 12, 1911.
1,022,245.
Patented Apr. 2, 1912.
2 SHEETS—SHEET 2.
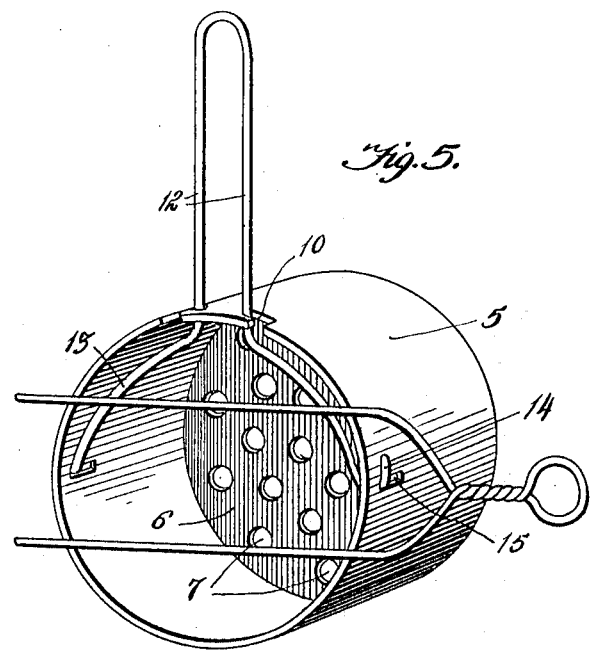
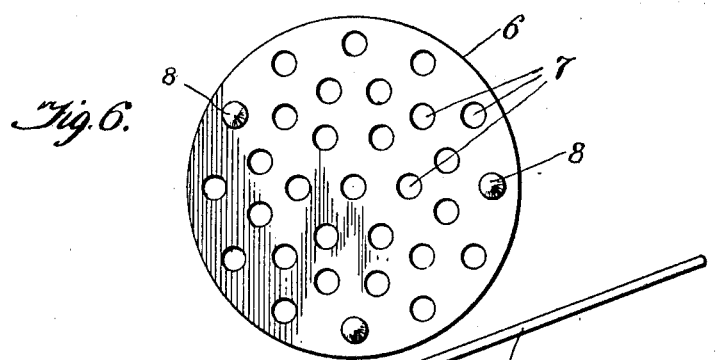
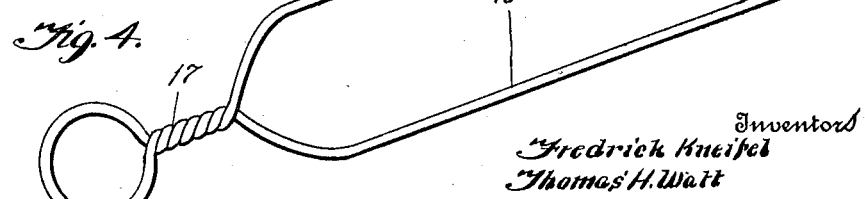
Witnesses
Alan F. Garners
F. O. Parker
Inventors
Fredrick Kneifel
Thomas H. Watt
By Victor J. Evans
Attorney
COLUMBIA PLANOGRAPH CO., WASHINGTON, D. C.

UNITED STATES PATENT OFFICE.

FREDRICK KNEIFEL AND THOMAS H. WATT, OF BARBERTON, OHIO.

COOKING UTENSIL.

1,022,245.  Specification of Letters Patent.  Patented Apr. 2, 1912.

Application filed September 12, 1911. Serial No. 648,890.

*To all whom it may concern:*

Be it known that we, FREDRICK KNEIFEL and THOMAS H. WATT, citizens of the United States, residing at Barberton, in the county of Summit and State of Ohio, have invented new and useful Improvements in Cooking Utensils, of which the following is a specification.

The invention relates to a container, and more particularly to the class of cooking utensils.

The primary object of the invention is the provision of a utensil in which articles of food may be placed, so as to avoid any possibility of the scorching, burning, or sticking thereof, during the cooking process, the utensil being adapted to be removably placed within a kettle or other cooker.

Another object of the invention is the provision of a device of this character in which a handle and a fork member may be connected therewith, so that the handle may be utilized for removing the device from a kettle, or other depository, also the fork being adapted to prevent the spilling of the contents when draining the water therefrom, after the cooking process.

A further object of the invention is the provision of a utensil of this character which is simple in construction, and useful in kitchens, and that is inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a vertical sectional view through a cooker, showing the removable container therein and the handle attached thereto. Fig. 2 is a vertical longitudinal sectional view through the container, showing the removable supplemental bottom. Fig. 3 is a perspective view of the handle removed from the container. Fig. 4 is a perspective view of the fork member. Fig. 5 is a perspective view, showing the container in tilted position, the handle connected thereto for holding it in pouring position, and the fork member arranged to prevent the spilling of the food within the container. Fig. 6 is a bottom plan view of the container.

Similar reference characters indicate corresponding parts throughout the several views of the drawings.

Referring to the drawings by numerals, the container comprises a hollow body having a circular side wall 5, and a flat bottom 6, the latter being provided with a plurality of perforations 7, so that water placed within a cooking vessel may circulate through the container for the cooking process.

Formed on the botom 6 and depending therefrom at predetermined spaced points are bearing lugs, forming legs 8, so that when the container is placed within the cooking vessel, the bottom 6 of the same will be held spaced from the bottom of such vessel, whereby the material confined within the container to be cooked will be prevented from burning or scorching, during the cooking process.

Removably fitted within the container and resting upon its bottom 6 is a superimposed supplemental bottom or disk 9, which is only used when disintegrated food stuff, such as rice, oatmeal, or the like, is being cooked or held within such container. However, on boiling potatoes or other large food stuffs that will not sift or fall through the perforations 7 in the bottom 6 of the container, the said supplemental bottom 9 is removed therefrom.

Cut in from the upper edge of the vertical wall 5, at one side thereof, are spaced L-shaped or bayonet slots 10, the inner branches 11 of which are directed toward each other, so as to form hooks, with which are adapted to engage the detachable handle, presently described.

The handle comprises a single strand of relative rigid wire, bent to form spaced parallel limbs 12 provided with outwardly curved ends 13 terminating in hooks 14, which latter are adapted to detachably engage in elongated slots 15 formed in the side wall 5 of the container at diametrically opposite points thereof. Thus, in this manner, the handle will be swingingly connected to the body of the container, and on the tilting of the latter the limbs 12 of the handle will enter the bayonet-shaped slots 10 and engage with the hooks 11, so as to hold the container in such pouring position.

In Fig. 4, there is shown a fork member, comprising a single strand of relative stiff wire, bent to provide spaced tines or limbs 16, and a handle 17, the tines being adapted to be disposed across the mouth of the container when the fork is carried in the hand of a person. Thus it will be seen that the limbs 16 of the fork member will prevent the contents from dropping from the container when draining the same.

In the use of the container, the same is placed within a suitable cooking vessel, for example, the receptacle 19 which is of the ordinary well-known type.

What is claimed is:

A utensil of the class described, comprising a body having spaced L-shaped slots cut in from the upper edge of its side wall, the inner branches of the slots being directed toward each other, so as to form hooks, and a handle comprising a single strand of rigid wire bent to provide spaced parallel limbs having outwardly curved ends provided with hooks for engagement with the body, the limbs being designed to engage in the L-shaped slots on the tilting of the body.

In testimony whereof we affix our signatures in presence of two witnesses.

FREDRICK KNEIFEL.
THOMAS H. WATT.

Witnesses:
W. A. MORTON,
S. A. DECKER.

Copies of this patent may be obtained for five cents each, by addressing the "Commissioner of Patents, Washington, D. C."